US008687591B2

(12) United States Patent
Ho et al.

(10) Patent No.: US 8,687,591 B2
(45) Date of Patent: Apr. 1, 2014

(54) RELAY NODE USER PLANE SUPPORT

(75) Inventors: Sai Yiu Duncan Ho, San Diego, CA (US); Parag Arun Agashe, San Diego, CA (US); Faith Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 12/763,825

(22) Filed: Apr. 20, 2010

(65) Prior Publication Data

US 2010/0274915 A1 Oct. 28, 2010

Related U.S. Application Data

(60) Provisional application No. 61/173,071, filed on Apr. 27, 2009.

(51) Int. Cl.
 *H04W 12/02* (2009.01)
(52) U.S. Cl.
 USPC ............ 370/331; 370/246; 370/412; 709/203
(58) Field of Classification Search
 USPC .................................. 709/203; 370/331, 246
 See application file for complete search history.

(56) References Cited

U.S. PATENT DOCUMENTS

| | | | | |
|---|---|---|---|---|
| 5,949,773 | A * | 9/1999 | Bhalla et al. | 370/331 |
| 7,209,480 | B2 * | 4/2007 | Ikeda | 370/389 |
| 7,218,630 | B1 * | 5/2007 | Rahman | 370/355 |
| 8,204,502 | B2 * | 6/2012 | Khetawat et al. | 455/436 |
| 8,305,965 | B2 * | 11/2012 | Shen et al. | 370/328 |
| 2003/0235212 | A1 * | 12/2003 | Kuo | 370/503 |
| 2004/0166841 | A1 * | 8/2004 | Parmar et al. | 455/422.1 |
| 2006/0203823 | A1 * | 9/2006 | Jiang | 370/394 |
| 2006/0221833 | A1 * | 10/2006 | Jiang | 370/235 |
| 2008/0076359 | A1 * | 3/2008 | Charpentier et al. | 455/63.1 |
| 2008/0310367 | A1 * | 12/2008 | Meylan | 370/331 |

(Continued)

FOREIGN PATENT DOCUMENTS

| | | |
|---|---|---|
| CN | 1781322 A | 5/2006 |
| EP | 1959601 | 8/2008 |

(Continued)

OTHER PUBLICATIONS

International Search Report and Written Opinion—PCT/US2010/032617, International Search Authority—European Patent Office—Jul. 15, 2010.
Taiwan Search Report—TW099113358—TIPO—Mar. 12, 2012.

*Primary Examiner* — Khanh Dinh
(74) *Attorney, Agent, or Firm* — Michael J. DeHaemer, Jr.

(57) ABSTRACT

Systems and methodologies are described that facilitate providing user plane support for internet protocol (IP) relays. Service data units (SDU) received at a radio communication layer can be provided to an upper communication layer, such as a packet data convergence protocol (PDCP) layer, without regard to sequence numbers. The upper communication layer can handle reordering of the received protocol data units. Since communications related to a plurality of devices through one or more IP relays can be mapped over a single bearer, allowing reordering at the upper communication layer can mitigate delay caused where a donor or other upstream access point is delayed in providing a sequential SDU related to one of a plurality of devices downstream. In this regard, SDUs related to other devices can be processed by the upper communication layer while waiting for the sequential SDU.

37 Claims, 11 Drawing Sheets

(56) References Cited

U.S. PATENT DOCUMENTS

2009/0016301 A1* 1/2009 Sammour et al. ............. 370/331
2009/0116399 A1* 5/2009 Ho et al. ...................... 370/252
2010/0272007 A1* 10/2010 Shen et al. ................... 370/315

FOREIGN PATENT DOCUMENTS

| EP | 2141937 | 1/2010 |
| TW | 200904096 A | 1/2009 |
| WO | WO2008136115 | 11/2008 |

\* cited by examiner

RELAY NODE USER PLANE SUPPORT

CLAIM OF PRIORITY UNDER 35 U.S.C. §119

The present Application for Patent claims priority to Provisional Application No. 61/173,071 entitled "A METHOD AND APPARATUS FOR RELAYS IN A WIRELESS COMMUNICATION SYSTEM" filed Apr. 27, 2009, and assigned to the assignee hereof and hereby expressly incorporated by reference herein.

BACKGROUND

1. Field

The following description relates generally to wireless communications, and more particularly to routing data packets among multiple access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Relay nodes can be provided to expand network capacity and coverage area by facilitating communication between mobile devices and access points. For example, a relay node can establish a backhaul link with a donor access point, which can provide access to a number of other relay nodes, and the relay node can establish an access link with one or more mobile devices or additional relay nodes. In this regard, however, the relay node can support a number of radio bearers with a number of mobile devices and/or other downstream relay nodes while being limited to a number of radio bearers that can be established with the donor access point. Similarly, downstream relay nodes can be limited in the number of radio bearers that can be established with the relay node. Thus, packets related to various devices and/or bearers related thereto can be transmitted over a single bearer to an upstream relay node or donor access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating allowing data to be communicated and processed out of order in radio communications. In an example, service data units (SDU) from a radio communication layer (e.g., a radio link control layer) can be transmitted from a donor access point or other upstream access point to a relay node. The radio communication layer receiver at the relay node can communicate the SDUs to an upper communication layer (e.g., as one or more protocol data units (PDU), as received regardless of order. This allows the upper communication layer (e.g., a packet data convergence protocol (PDCP) layer) to handle reordering of the PDUs. Thus, the radio communication layer can provide the PDUs to the upper communication layer without waiting for the next PDU in the sequence. In this regard, communications related to a device can be processed at the relay node though communications for another device are delayed (e.g., have not been received from the donor access point or other upstream access point).

According to related aspects, a method is provided that includes obtaining a SDU from a received signal and generating a PDU related to an upper communication layer based at least in part on the SDU. The method further includes delivering the PDU to the upper communication layer regardless of a sequence number in the SDU.

Another aspect relates to a wireless communications apparatus. The wireless communications apparatus can include at least one processor configured to receive a SDU related to a received signal and create a PDU for an upper communication layer based at least in part on the SDU. The at least one processor is further configured to communicate the PDU to the upper communication layer regardless of a sequence number in the SDU. The wireless communications apparatus also comprises a memory coupled to the at least one processor.

Yet another aspect relates to an apparatus. The apparatus includes means for receiving a SDU at a radio communication layer and means for generating a PDU for an upper communication layer based at least in part on the SDU. The apparatus also includes means for delivering the PDU to the upper communication layer regardless of a sequence number in the SDU.

Still another aspect relates to a computer program product, which can have a computer-readable medium including code for causing at least one computer to receive a SDU related to a received signal and code for causing the at least one computer to create a PDU for an upper communication layer based at least in part on the SDU. The computer-readable medium can also comprise code for causing the at least one computer to communicate the PDU to the upper communication layer regardless of a sequence number in the SDU.

Moreover, an additional aspect relates to an apparatus including a receiving component that obtains a SDU at a radio communication layer and a PDU generating component that creates a PDU for an upper communication layer based at least in part on the SDU. The apparatus can further include a delivering component that communicates the PDU to the upper communication layer regardless of a sequence number in the SDU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
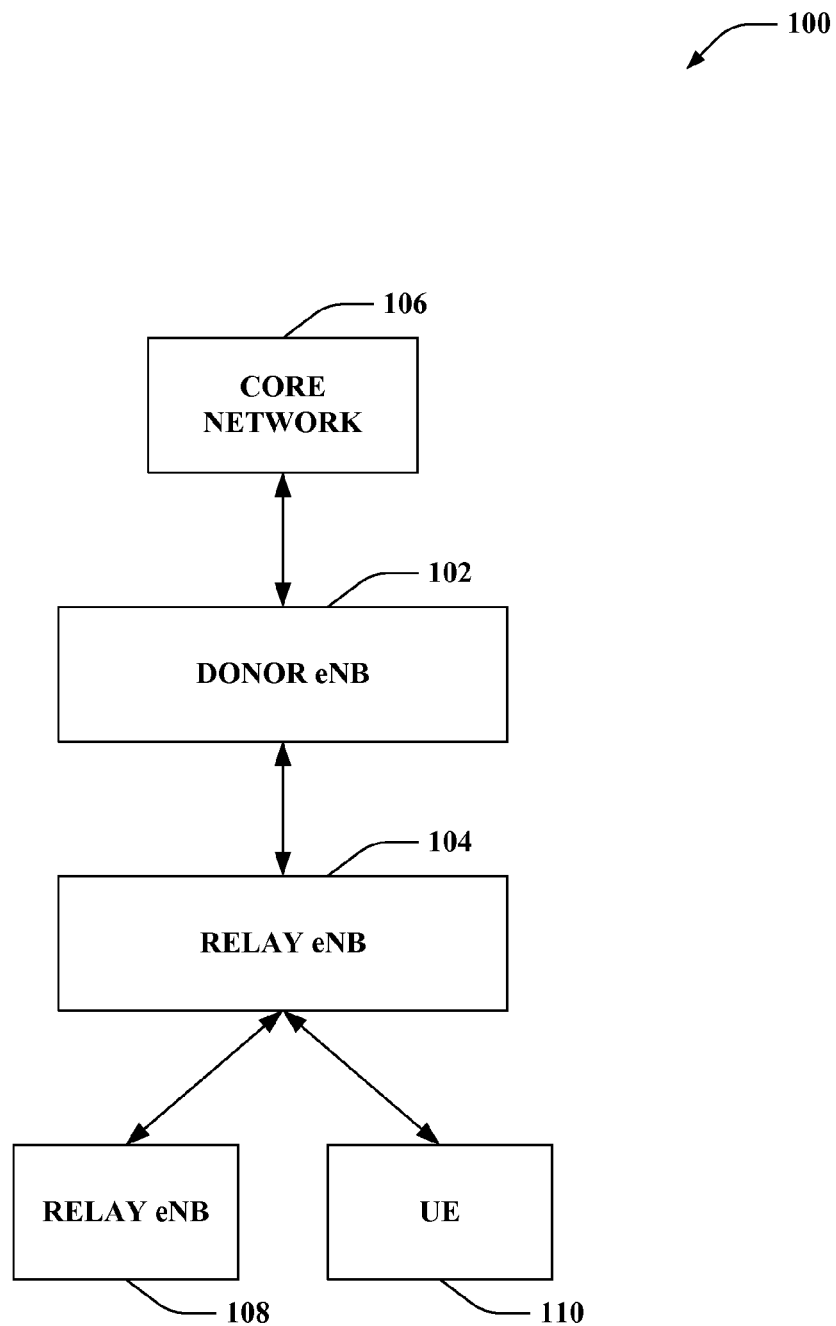
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer), transport layer, application layer, and/or the like, as would a UE in conventional LTE configurations. In this regard, donor eNB 102 can act as a conventional LTE eNB requiring no changes at the link layer, transport layer, application layer, etc, or related interface (e.g., user-to-user (Uu), such as E-UTRA-Uu, user-to-network (Un), such as EUTRA-Un, etc.), to support the relay eNB 104. In addition, relay eNB 104 can appear to UE 110 as a conventional eNB in LTE configurations at the link layer, transport layer, application layer, and/or the like, such that no changes are required for UE 110 to connect to relay eNB 104 at the link layer, transport layer, application layer, etc., for example. In addition, relay eNB 104 can configure procedures for resource partitioning between access and backhaul link, interference management, idle mode cell selection for a cluster, and/or the like. It is to be appreciated that relay eNB 104 can connect to additional donor eNBs, in one example.

Thus, for example, relay eNB 104 can establish a connection with donor eNB 102 to receive access to one or more components in core network 106 (such as a mobility management entity (MME), serving gateway (SGW), packet data network (PDN) gateway (PGW), etc.). In an example, relay eNB 104 can obtain an internet protocol (IP) address from a PGW/SGW in the core network 106 (e.g., via donor eNB 102) for communicating therewith. In addition, UE 110 can establish a connection with relay eNB 104 to receive access to one or more similar components in core network 106. In this regard, for example, UE 110 can communicate IP packets to relay eNB 104 for providing to core network 106. Relay eNB 104 can obtain the IP packets, associate an additional IP header with the packets related to relay eNB 104, and provide the packets to donor eNB 102. Thus, donor eNB 102 can route the packets to a component of core network 106 related to relay eNB 104 (e.g., by adding another header and transmitting to core network 106).

Components of core network 106, for example, can route the packets within the core network 106 according to the various IP headers. Moreover, for example, core network 106 can construct packets for providing to UE 110 to include IP headers related to routing the packet to UE 110 through relay eNB 104. In an example, core network 106 can include an IP header related to UE 110 with the packet, as well as an IP header related to relay eNB 104, and one related to donor eNB 102. Core network 106 can forward the packet with the headers to donor eNB 102. Donor eNB 102 can obtain the packet, remove the IP header related to donor eNB 102, and forward the packet to relay eNB 104 based on the next IP header. Relay eNB 104 can similarly remove the header related to relay eNB 104, in one example, and relay eNB 104 can forward the packet to UE 110 based on the remaining IP header or another header. Though one relay eNB 104 is shown between UE 110 and donor eNB 102, it is to be appreciated that additional relay eNBs can exist, and IP headers can be added to uplink and downlink packets, as described, for each relay eNB to facilitate packet routing.

Moreover, as described, since relay eNB 104 can connect as a UE to donor eNB 102, it can also be limited by donor eNB 102 to a number of radio bearers that can be established therewith. Relay eNB 104, however, can similarly allow UE 110, and additional UEs, to establish a number of radio bearers with relay eNB 104. In this regard, radio bearers established between UE 110 and relay eNB 104 can be mapped to the limited radio bearers established between relay eNB 104 and donor eNB 102. In an example, core network 106 can perform such mapping to ensure routing of packets to relay eNB 104 through donor eNB 102. In any case, donor eNB 102 can transmit packets related to UE 110, and one or more additional UEs (not shown) communicating with relay eNB 104, to relay eNB 104 over a radio communication layer, such as a radio link control (RLC) layer. It is to be appreciated that the radio communication layer can transmit the packets as one or more service data units (SDU) across the radio communication layer, and the SDUs can indicate a sequence number for subsequent ordering and processing of the SDUs. In addition, the radio communication layer can utilize one or more lower layers to communicate the SDUs, in one example.

Upon receiving the SDUs at the relay eNB 104, the radio communication layer can formulate one or more protocol data units (PDU) from the SDUs for providing to an upper layer, such as a packet data convergence protocol (PDCP) layer. For a given radio bearer between donor eNB 102 and relay eNB 104, as described, SDUs can be received over the radio communication layer relating to disparate UEs. The radio communication layer can provide PDUs related to SDUs to the upper layer as received, regardless of an indicated sequence number of the SDUs. In this regard, the upper layer can receive a PDU corresponding to an SDU received from donor eNB 102 and related to UE 110 at the radio communication layer, though one or more disparate SDUs for a disparate UE with a lower sequence number have not been received at the radio communication layer. It is to be appreciated, for example, that existing network standards such as LTE or other wireless communications standards, can require that the SDUs be delivered as PDUs to the upper layer in sequence, which can cause delay where an SDU from a UE is delayed and SDUs related to other UEs are received during the delay.

Figure 2:
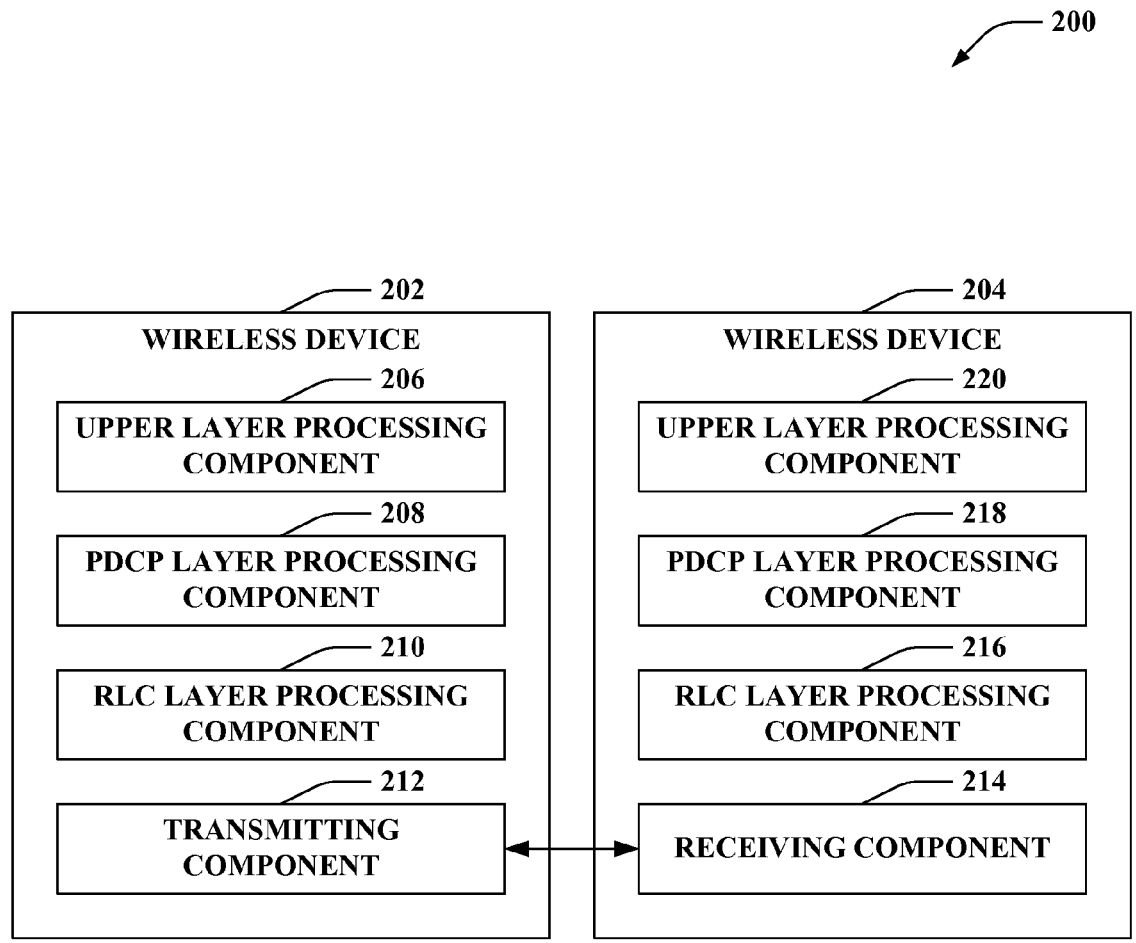
FIG. 2 is an illustration of an example wireless communications system that facilitates communicating data over multiple communication layers.

Turning to FIG. 2, a wireless communication system 200 is illustrated that facilitates supporting user plane communications among devices in a wireless network. System 200 includes wireless device 202 and wireless device 204, which can communicate in a wireless network. Wireless devices 202 and 204 can each be an access point (e.g., a macrocell access point, femtocell access point, picocell access point, mobile base station, relay node, etc), a mobile device (such as a UE, a modem or other tethered device, etc.), and/or the like. In an example, wireless device 202 can communicate downstream with wireless device 204 to provide network access. In addition, as described, wireless device 202 can communicate with a plurality of disparate devices over a plurality of radio bearers established with the disparate devices to provide access to wireless device 204. In addition, wireless device 204 can establish a limited number of radio bearers with wireless device 202 such that wireless device 204 maps communications from the disparate devices over one of the limited number of radio bearers with wireless device 202.

Wireless device 202 includes an upper layer processing component 206 that obtains data from an upper layer (e.g., an application layer or substantially any layer above a PDCP or other packet data layer) for providing to a packet data layer and a PDCP layer processing component 208 that formulates data received from an upper layer into one or more PDUs for communicating over a wireless connection. Wireless device 202 also includes an RLC layer processing component 210 that generates one or more SDUs from a received packet data layer PDU for transmitting over a wireless connection and a transmitting component 212 that communicates the SDUs to a disparate wireless device.

Wireless device 204 includes a receiving component 214 that obtains one or more radio layer SDUs from a disparate wireless device and an RLC layer processing component 216 that generates PDUs for delivery to an upper layer. Wireless device 204 additionally includes a PDCP layer processing component 218 that prepares one or more PDUs received from a lower layer for delivering data to an upper layer and an upper layer processing component 220 that obtains and utilizes data received from a lower layer (e.g., in an application that supports communication with the disparate wireless device, etc.).

According to an example, upper layer processing component 206 can receive data for communicating in a wireless network (e.g., from an application executing on wireless device 202) and can deliver the data to PDCP layer processing component 208 for communicating to the wireless network. PDCP layer processing component 208 can generate one or more PDUs comprising the data according to a PDCP layer specification. For example, PDCP layer processing component 208 can apply header compression to the data and/or other procedures and can then include the data in the one or more PDUs. PDCP layer processing component 208 can deliver the PDUs to RLC layer processing component 210. RLC layer processing component 210 can obtain the PDUs and can prepare the PDUs for transmitting to wireless device 204. For example, RLC layer processing component 210 can break the PDUs into one or more RLC layer SDUs according to one or more communication parameters (such as available bandwidth, connection reliability with the wireless device 204, and/or the like). RLC layer processing component 210 can provide the SDUs to transmitting component 212 for communicating in one or more signals to wireless device 204. Transmitting component 212 can transmit the SDUs to wireless device 204 over one or more established bearers.

Receiving component 214 can obtain the SDUs from wireless device 202. As described, the SDUs can relate to a plurality of wireless devices and can be received over a limited number of bearers between wireless device 202 and wireless device 204. Receiving component 214 can forward the SDUs to RLC layer processing component 216. RLC layer processing component 216 can create PDUs based on one or more received SDUs (e.g., based at least in part on a header and/or sequence numbers related to the SDUs) and, as described, can associate a sequence number with the PDUs (e.g., based on one or more parameters of at least a portion of the corresponding SDU(s) and/or the like). RLC layer processing component 216 can, as described, forward the PDUs to PDCP layer processing component 218 as received (e.g., without regard to sequence number in the SDUs).

In this regard, PDCP layer processing component 218 can order the PDUs before sending to the upper layer processing component 220 to ensure in-order delivery thereto. PDCP layer processing component 208 can thus receive PDUs from RLC layer processing component 216 regardless of order and can formulate sequential PDUs into packets for communicating to upper layer processing component 206. For example, RLC layer processing component 216 can receive SDUs with sequence numbers 1 and 3 from receiving component 214. In this example, RLC layer processing component 216 has not received all (or any) SDUs that comprise sequence number 2. RLC layer processing component 216 can provide PDUs related to the SDUs with sequence numbers 1 and 3 to PDCP layer processing component 218 without waiting for the one or more SDUs with sequence number 2.

Thus, PDCP layer processing component 218 can obtain the PDUs comprising SDUs with sequence numbers 1 and 3, which can each relate to a packet corresponding to one or more devices that differ from a device that relates to the SDU with sequence number 2. In this regard, for example, if one or more packets can be completely formed from the PDUs with SDUs having sequence numbers 1 and/or 3 (e.g., form a packet together and/or in combination with one or more disparate received PDUs), PDCP layer processing component 218 can deliver the packet to upper layer processing component 220 though a PDU with SDU having sequence number 2 has not yet been received. Similarly, upper layer processing component 220 can utilize the packet to perform functionality for wireless device 202. Though the wireless devices 202 and 204 are shown and described in terms of downlink communications from wireless device 202 to wireless device 204, it is to be appreciated that the same components and functionality can be used for uplink and/or substantially any connection where packets related to a plurality of devices are sent over a single radio bearer or communication tunnel, for example.

Figure 3:
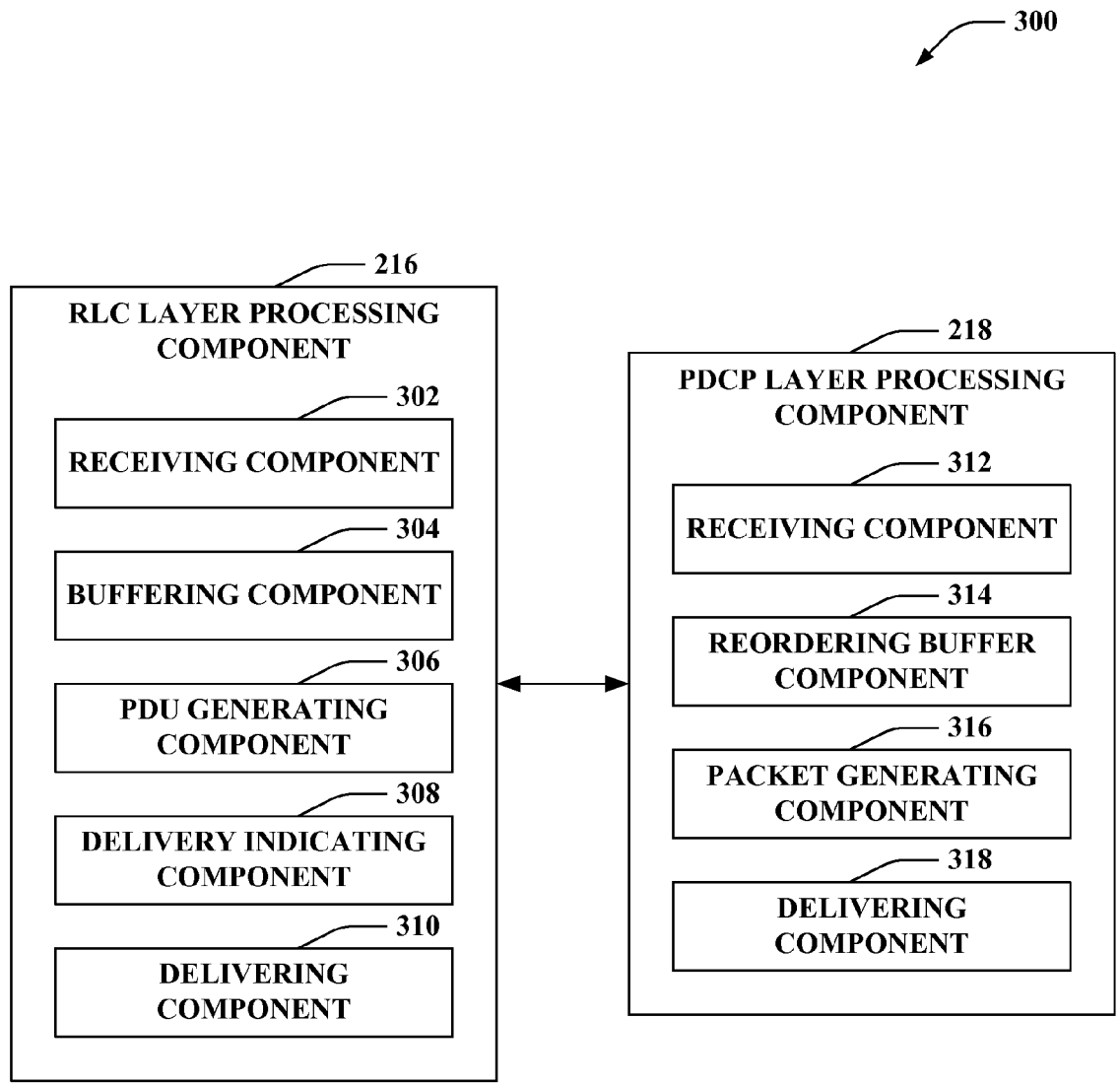
FIG. 3 is an illustration of communication layer components that facilitate communicating service data units (SDU) without regard to associated sequence numbers.

Referring to FIG. 3, illustrated are example communication layer processing components 300 that can be employed in a wireless device to facilitate wireless communications. An RLC layer processing component 216 is illustrated that delivers PDUs to an upper layer as well as a PDCP layer processing component 218 that similarly delivers PDUs received from a radio communication layer to a disparate upper layer. For example, RLC layer processing component 216 and PDCP layer processing component 218 can be implemented within a wireless device, such as an access point, mobile device, etc., as described, and can process communications received from various disparate devices over a limited number of radio bearers.

RLC layer processing component 216 can include a receiving component 302 that obtains at least a portion of one or more SDUs (e.g., from a lower layer component such as a physical receiver), a buffering component 304 that can include the at least the portion of one or more SDUs in a reception buffer to support retransmission, and a PDU generating component 306 that can create one or more PDUs from one or more whole SDUs. RLC layer processing component 216 can additionally include a delivery indicating component 308 that can set a value corresponding to an SDU that specifies whether the SDU has been provided to an upper layer (e.g., as a PDU) and a delivering component 310 that communicates one or more PDUs to an upper layer. PDCP layer processing component 218 can comprise a receiving component 312 that can obtain one or more PDUs from a lower layer and a reordering buffer component 314 that can store one or more PDUs requiring additional PDUs to formulate a complete packet. PDCP layer processing component 218 can also include a packet generating component 316 that creates one or more packets from one or more received PDUs and a delivering component 318 that communicates the one or more packets to an upper layer (e.g., an application layer and/or the like).

According to an example, receiving component 302 can obtain an SDU related to a downstream device and received from an upstream access point over a receiver, as described. Buffering component 304 can store the SDU in a reception buffer to maintain proper functioning of a retransmission scheme, such as automatic repeat/request (ARQ), hybrid ARQ (HARQ), etc. PDU generating component 306 can formulate a PDU for providing to an upper layer based at least in part on one or more whole SDUs. In one example, one or more headers of the SDU(s) can indicate a structure for the related PDU using the one or more SDUs. In addition, PDU generating component 306 can include a header with the PDU that specifies one or more parameters thereof, such as a sequence number, length, and/or the like. Once a PDU is formulated, delivering component 310 can provide the PDU to the PDCP layer processing component 218 regardless of the sequence number.

In addition, for example, delivery indicating component 308 can set a flag or other indicator for an SDU in the reception buffer when the SDU is provided to the PDCP layer processing component 218 as part of a PDU. This can include initializing a value associated with the SDU (e.g., in a header, a related table, etc.), for example. Moreover, buffering component 304 can reorder SDUs, or portions thereof, upon receiving additional SDUs or portions by receiving component 302 and/or at substantially any other time (e.g., according to a timer or other event). By performing reordering, the buffering component 304 can determine whether there are missing SDUs or portions according to the sequence numbers of the SDUs in the reception buffer, for example. Following reordering, PDU generating component 306 can utilize the flag or other indicator in an SDU to ensure that a duplicate PDU is not created and delivered to PDCP layer processing component 218. Thus, once the SDU is included in a PDU and provided to the upper layer, buffering component 304 can remove the SDU from the buffer, send an acknowledgement (ACK) related to the SDU to a related device, and/or the like.

Receiving component 312 can obtain one or more PDUs from RLC layer processing component 216, and the PDUs can be received out-of-order according to a related sequence number, as described. Reordering buffer component 314 can store the PDUs upon receipt from receiving component 312. Packet generating component 316 can create packets from one or more PDUs that can be combined to formulate a packet. The packet generating component 316, for example, can determine one or more PDUs necessary to create the packet based at least in part on one or more parameters in a header of at least one of the PDUs (e.g., a starting sequence number, an ending sequence number, a packet length, and/or the like). In addition, the packet generating component 316 can include additional parameters in the packet, such as a header including a similar sequence number, size, etc. Once a packet is formulated, delivering component 318 can provide the packet to an upper layer. Thus, packets can be formulated from PDUs as the PDUs arrive at the PDCP layer processing component 218. Where a packet cannot be formed because of a PDU that has not been received in the sequence of PDUs that correspond to the packet, other packets (e.g., related to other devices) can be formed regardless of the PDU that has not been received and provided to the upper layer, in one example.

In addition, PDUs can remain in the reordering buffer component 314 until substantially all PDUs that form a related packet are received by receiving component 312, at which point the packet is created and delivered. For example, the RLC layer processing component 216 can consistently attempt to deliver missing PDUs until received by receiving component 312. As similarly described above, the reordering buffer component 314 can reorder the buffer according to sequence number of the received PDUs upon receiving a PDU by receiving component 312 and/or otherwise, to determine whether PDUs have or have not been received.

Figure 4:
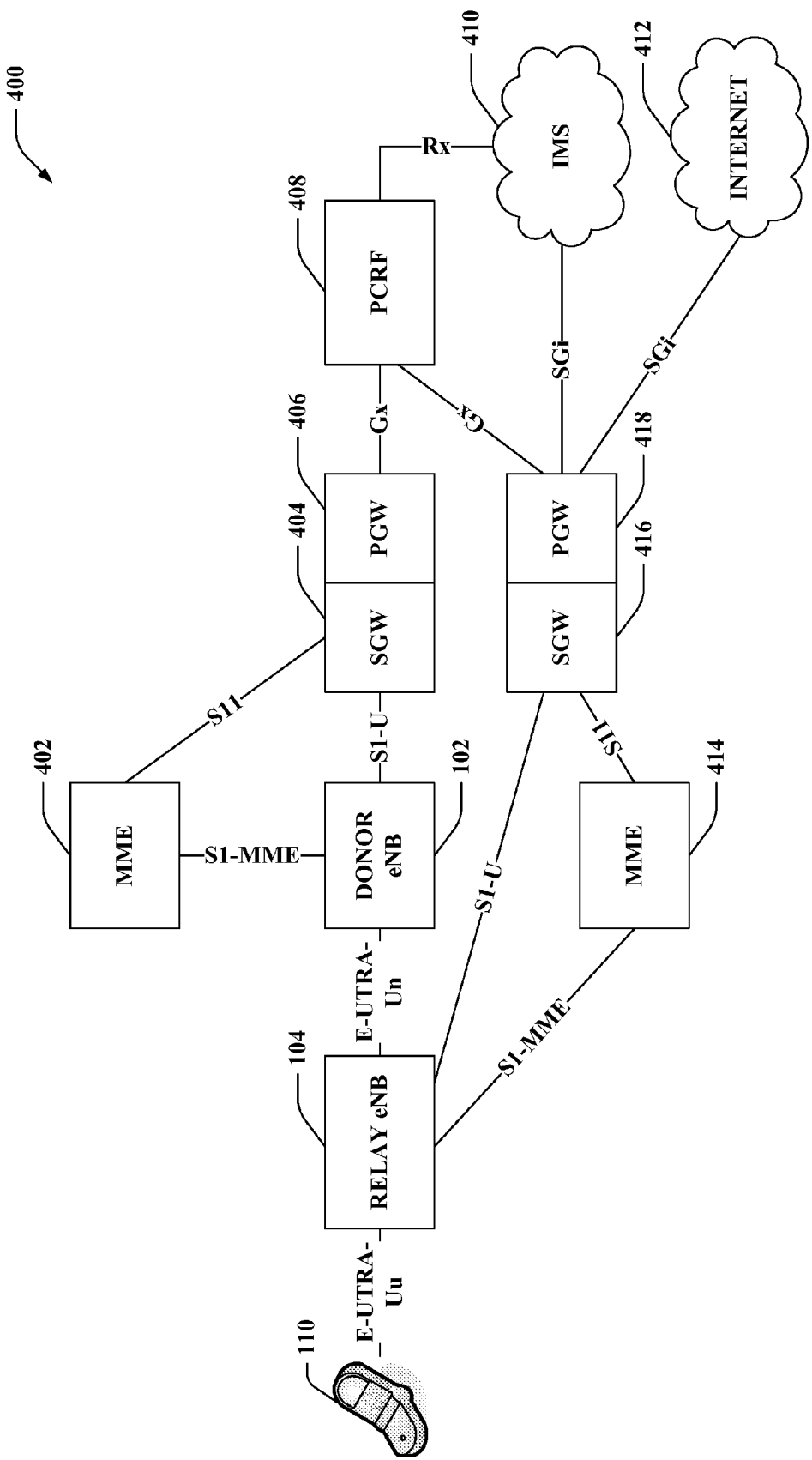
FIG. 4 is an illustration of an example wireless communications system that utilizes internet protocol (IP) relays to provide access to a wireless network.

Now turning to FIG. 4, an example wireless communication network 400 that provides IP relay functionality is depicted. Network 400 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 402 and/or SGW 404 that relate to the relay eNB 104. SGW 404 can connect to or be coupled with a PGW 406, which provides network access to SGW 404 and/or additional SGWs. PGW 406 can communicate with a policy and charging rules function (PCRF) 408 to authenticate/authorize relay eNB 104 to use the network, which can utilize an IP multimedia subsystem (IMS) 410 to provide addressing to the relay eNB 104.

According to an example, SGW 404 and PGW 406 can also communicate with SGW 416 and PGW 418, which can be related to UE 110. For example, SGW 416 and/or PGW 418 can assign an IP address to UE 110 and can communicate therewith via SGW 404 and PGW 406, donor eNB 102, and relay eNB 104. Communications between UE 110 and SGW 416 and/or PGW 418 can be tunneled through the nodes. SGW 404 and PGW 406 can similarly tunnel communications between UE 110 and MME 414. PGW 418 can similarly communicate with a PCRF 408 to authenticate/authorize UE 110, which can communicate with an IMS 410. In addition, PGW 418 can communicate directly with the IMS 410 and/or internet 412.

In an example, UE 110 can communicate with the relay eNB 104 over one or more radio protocol interfaces, such as an E-UTRA-Uu interface, as described, and the relay eNB 104 can communicate with the donor eNB 102 using one or more radio protocol interfaces, such as an E-UTRA-Un or other interface. As described, relay eNB 104 can add a user datagram protocol (UDP)/IP and/or general packet radio service (GPRS) tunneling protocol (GTP) header related to SGW 404 and/or PGW 406 to packets received from UE 110 and can forward the packets to donor eNB 102. Moreover, relay eNB 104 can map the packets to at least one of a limited number of radio bearers established with donor eNB 102. Donor eNB 102 communicates with the MME 402 using an S1-MME interface and the SGW 404 and PGW 406 over an S1-U interface, as depicted. For example, donor eNB 102 can similarly add an UDP/IP and/or GTP header to the packets and forward to MME 402 or SGW 404.

SGW 404 and/or PGW 406 can utilize the UDP/IP and/or GTP headers to route the packets within the core network. For example, as described, SGW 404 and/or PGW 406 can receive the packets and remove the outer UDP/IP and/or GTP header, which relates to the SGW 404 and/or PGW 406. SGW 404 and/or PGW 406 can process the next UDP/IP and/or GTP header to determine a next node to receive the packets, which can be SGW 416 and/or PGW 418, which relate to UE 110. Similarly, SGW 416 and/or PGW 418 can obtain downlink packets related to UE and can include an UDP/IP header and/or GTP header related to communicating the packets to relay eNB 104 for providing to UE 110. SGW 416 and/or PGW 418 can forward the packets to SGW 404 and/or PGW 406, which relate to relay eNB 104. SGW 404 and/or PGW 406 can further include an additional UDP/IP and/or GTP header in the packets related to donor eNB 102.

Moreover, SGW 404 and/or PGW 406 can select a GTP tunnel over which to communicate the packets to donor eNB 102. This can be based on information in the UDP/IP and/or GTP headers received from SGW 416 and/or PGW 418, as described, and/or the like. SGW 404 and/or PGW 406 can communicate the packets to donor eNB 102 over the tunnel (e.g., by including one or more parameters in the GTP header included by SGW 404 and/or PGW 406). Donor eNB 102 can remove the outer GTP and/or UDP/IP header included by SGW 404 and/or PGW 406 and can determine a next node to receive the packets. Donor eNB 102 can thus transmit the packets to relay eNB 104 over a radio bearer related to the GTP tunnel Relay eNB 104 can receive SDUs related to the packets at an RLC layer, as described, and can forward the SDUs to a PDCP layer as PDUs when received (e.g., without waiting for sequential RLC SDUs, as described). The PDCP layer can reformulate the packets from the PDUs, as described, and can similarly determine a next node to receive the packets and/or a bearer over which to transmit the packets based at least in part on one or more parameters in the next UDP/IP or GTP header, the radio bearer over which the packets are received, etc. Relay eNB 104 can remove the UDP/IP and GTP headers and can transmit the packets to UE 110.

Figure 5:
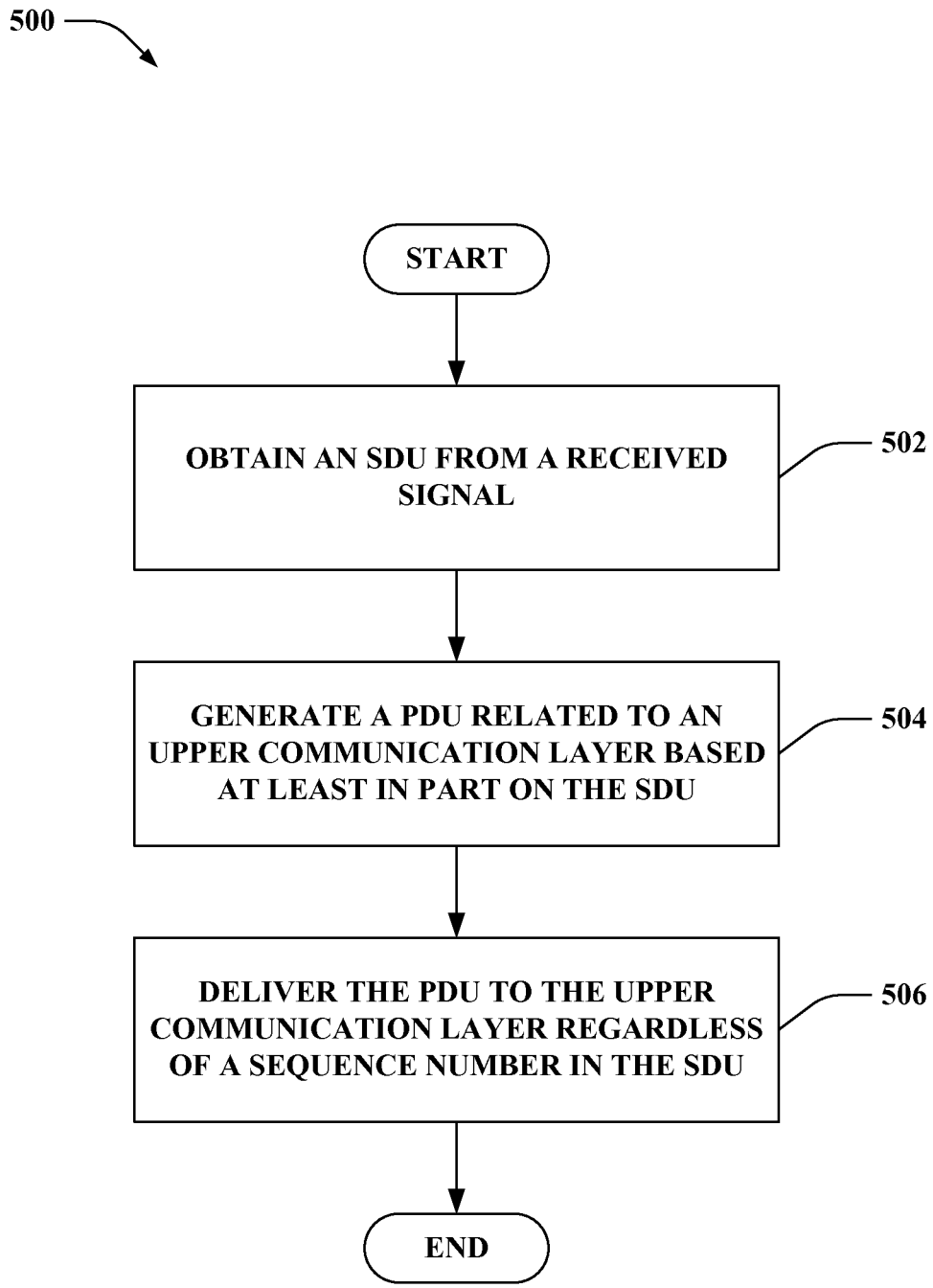
FIG. 5 is an illustration of an example methodology for delivering out-of-order SDUs to an upper communication layer.
Figure 6:
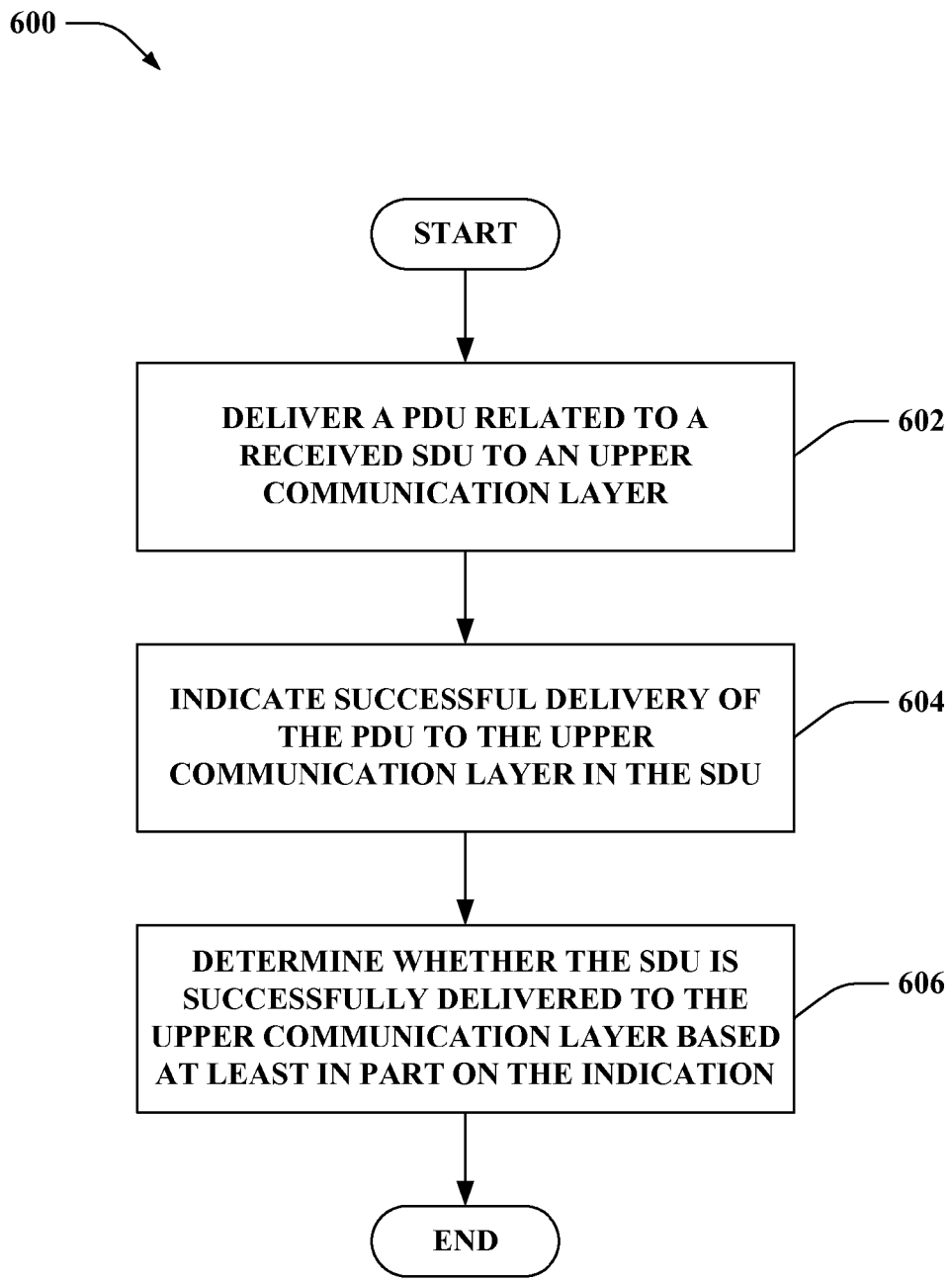
FIG. 6 is an illustration of an example methodology that indicates a delivery status of one or more SDUs in a reception buffer.
Figure 7:
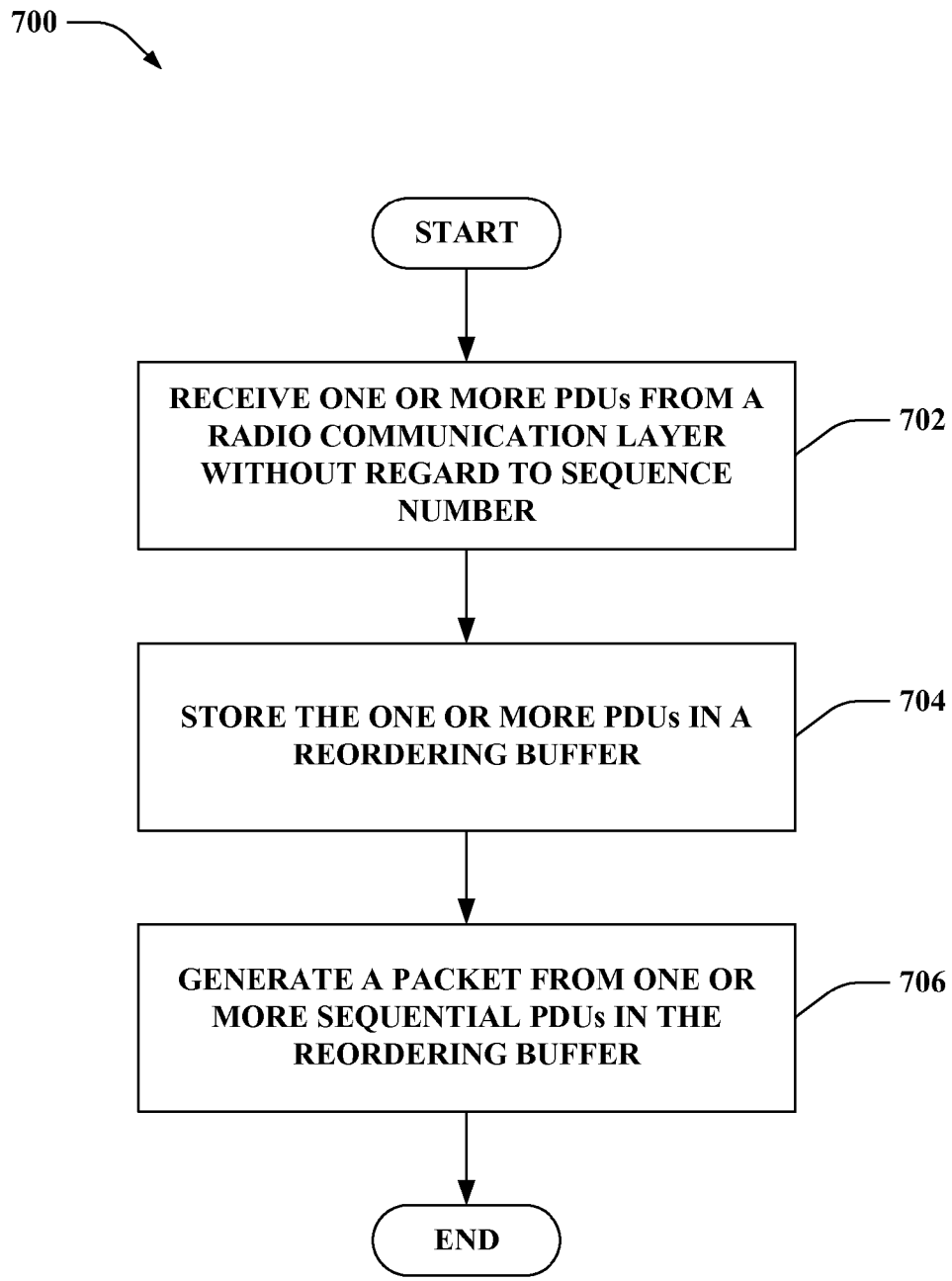
FIG. 7 is an illustration of an example methodology that stores received protocol data units (PDU) in a reordering buffer at an upper communication layer.

Referring to FIGS. 5-7, methodologies relating to supporting user plane for IP relays communications are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 5, an example methodology 500 that facilitates delivering PDUs to an upper communication layer regardless of sequence number is illustrated. At 502, an SDU can be obtained from a received signal. As described, for example, the signal can be mapped to and received over one of a limited number of radio bearers. At 504, a PDU related to an upper communication layer can be generated based at least in part on the SDU. For example, this can include adding a header to the SDU for processing by the upper communication layer. At 506, the PDU can be delivered to the upper communication layer regardless of a sequence number in the SDU. Thus, for example, the PDU can be generated and delivered though a SDU with a smaller sequence number is not yet received. Once the SDU with the smaller sequence number is subsequently received, the related PDU can be transmitted to the upper communication layer subsequent to the SDU with the larger sequence number. In this regard, the upper communication layer, which can be a PDCP or similar layer, can provide PDU ordering, as described previously.

Referring to FIG. 6, an example methodology 600 is depicted that facilitates managing one or more SDUs in a buffer. At 602, a PDU related to a received SDU can be delivered to an upper communication layer. As described, this can include associating a header with the SDU, which can include one or more parameters related thereto. At 604, successful delivery of the PDU to the upper communication layer can be indicated in the SDU. In this regard, as described, the SDU can be stored in a buffer (e.g., to preserve a retransmission mechanism at a radio communication layer). Thus, for example, a flag or other parameter related to the SDU can be set to specify that the SDU is successfully delivered to the upper communication layer. Subsequently, at 606, it can be determined whether the SDU is successfully delivered to the upper communication layer based at least in part on the indication. Thus, if so, the SDU need not be redelivered thereto and can be removed from the buffer, in one example.

Turning to FIG. 7, an example methodology 700 is depicted that facilitates generating a packet from one or more received PDUs. At 702, one or more PDUs can be received from a radio communication layer without regard to sequence number. Thus, the PDUs can be received out-of-order, as described, to mitigate delay for packets related to one or more devices mapped to a related radio bearer. At 704, the one or more PDUs can be stored in a reordering buffer. In one example, substantially all received PDUs can be stored in the reordering buffer. In another example, PDUs that are not communicated upstream can be stored in the reordering buffer. At 706, a packet can be generated from one or more sequential PDUs in the reordering buffer. In this regard, PDUs that cannot be utilized to generate a packet (e.g., because one or more related PDUs have not yet been received) can remain in the reordering buffer until PDUs corresponding to a similar packet are received.

It will be appreciated that, in accordance with one or more aspects described herein, inferences can be made regarding determining PDUs needed for generating a packet, discerning whether to retransmit an SDU, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
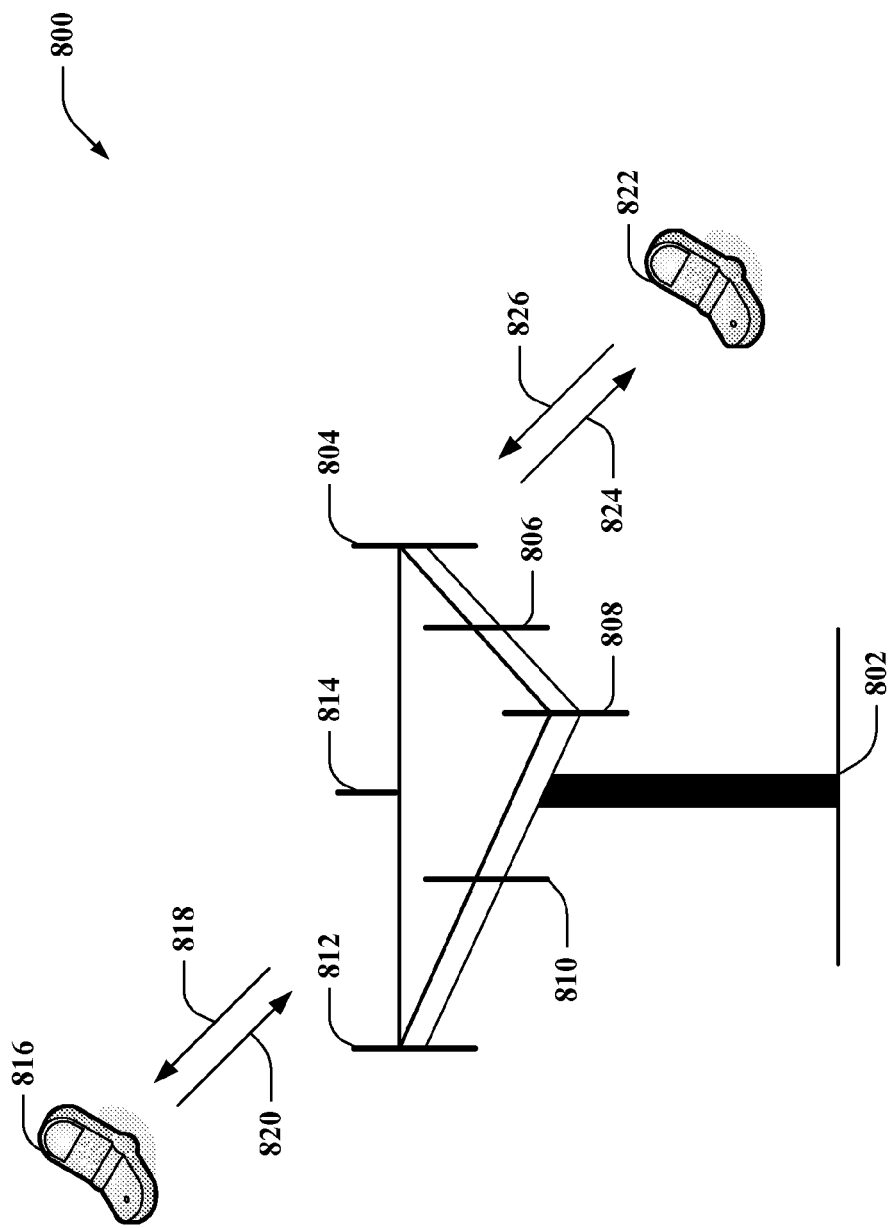
FIG. 8 is an illustration of a wireless communication system in accordance with various aspects set forth herein.

Referring now to FIG. 8, a wireless communication system 800 is illustrated in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology (not shown).

According to an example, system 800 can be a multiple-input multiple-output (MIMO) communication system. Further, system 800 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 802 can communicate to the mobile devices 816 and 822 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 9:
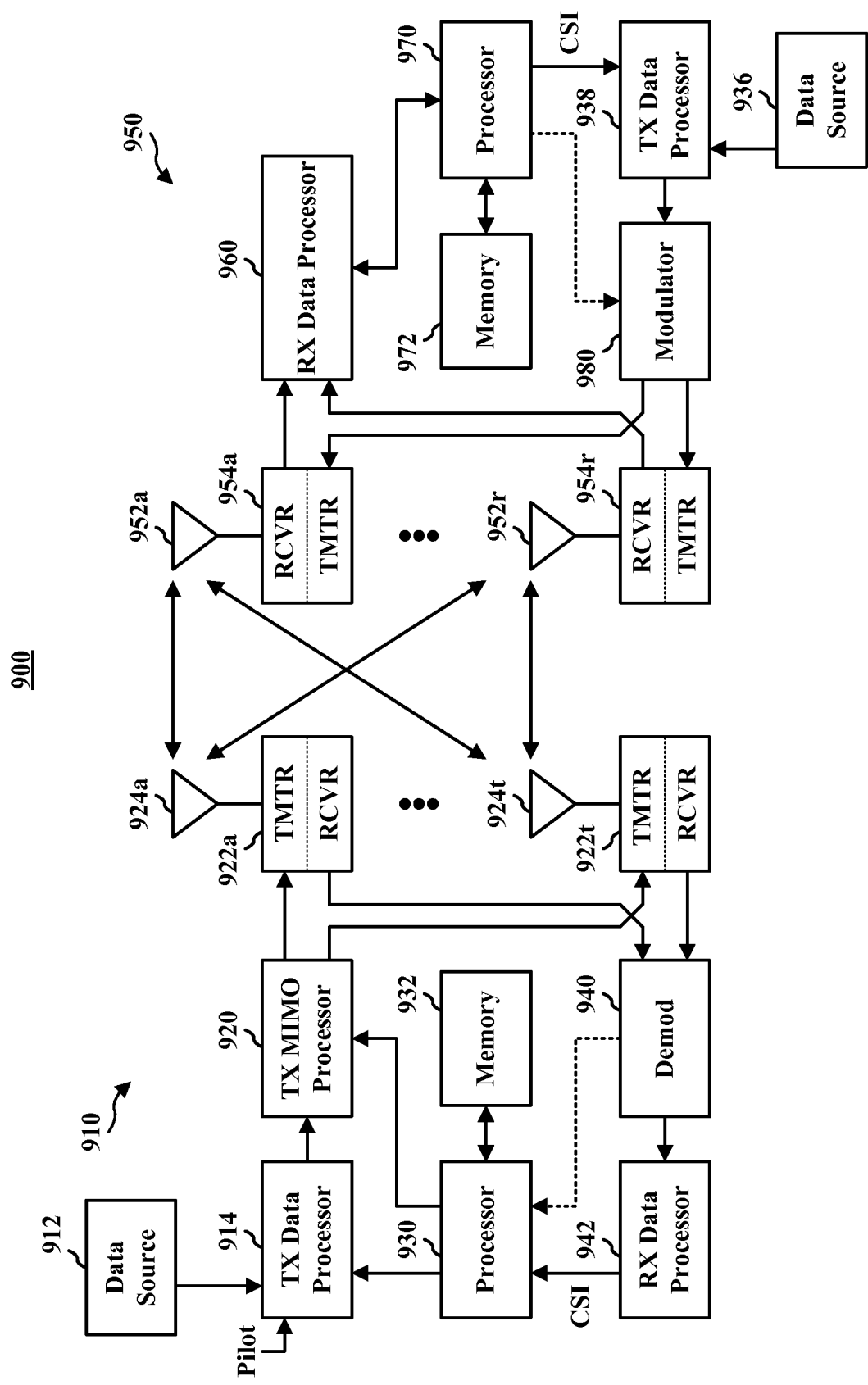
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 8) and/or methods (FIGS. 5-7) described herein to facilitate wireless communication therebetween.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

Figure 10:
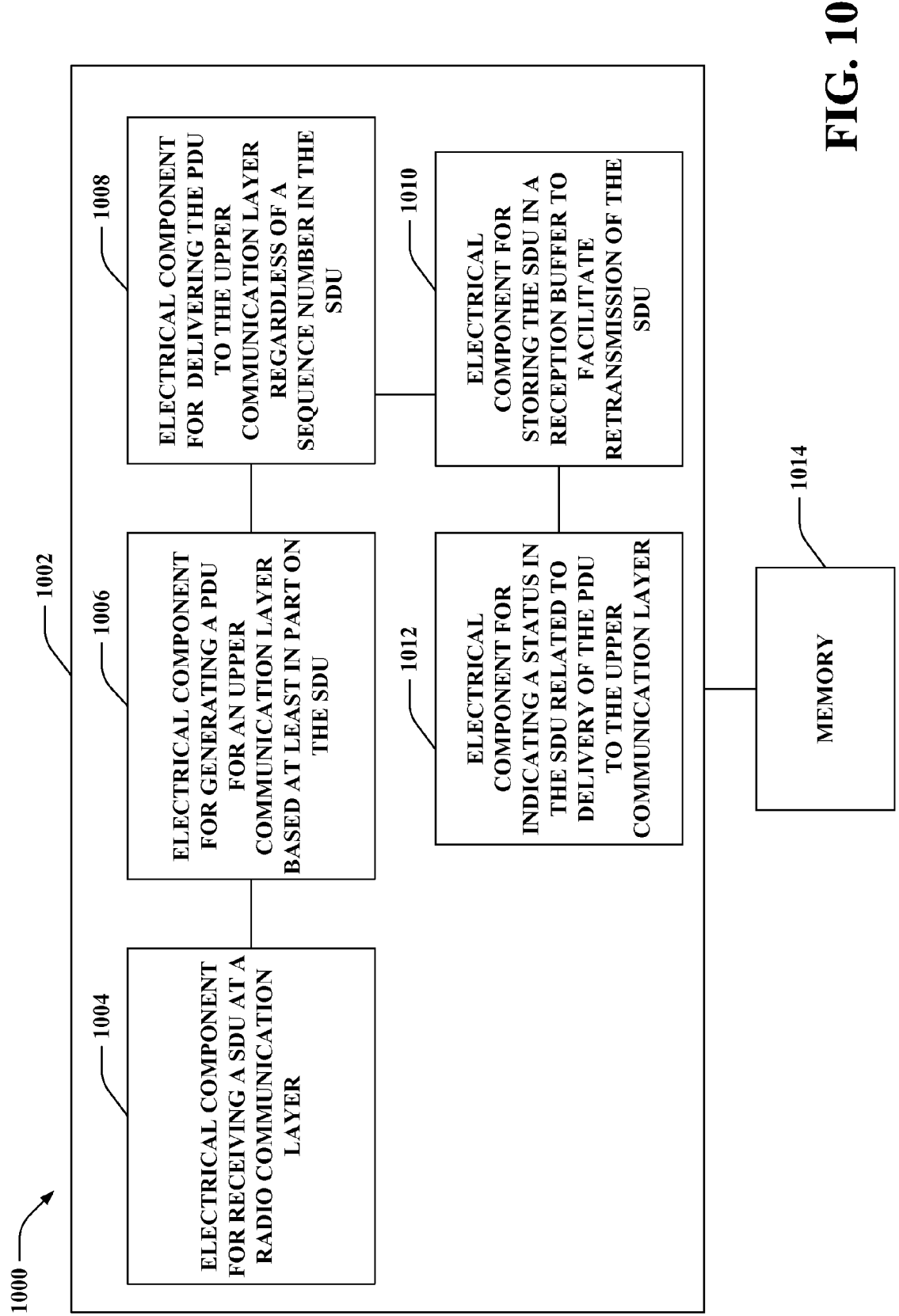
FIG. 10 is an illustration of an example system that communicates SDUs to an upper communication layer without regard to associated sequence numbers.

With reference to FIG. 10, illustrated is a system 1000 that facilitates communicating PDUs to an upper communication layer regardless of an associated sequence number. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a SDU at a radio communication layer 1004. For example, as described, radio communication layer can be an RLC or similar layer, and the SDU can be received in a signal from one or more devices. Additionally, logical grouping 1002 can include an electrical component for generating a PDU for an upper communication layer based at least in part on the SDU 1006. As described, this can include associating a header with the SDU, which can include a sequence number and/or additional parameters related to the PDU.

Moreover, logical grouping 1002 can include an electrical component for delivering the PDU to the upper communication layer regardless of sequence number in the SDU 1008. For example, this can include delivering SDUs in PDUs to the upper communication layer as received, such that PDUs can be delivered out-of-order to mitigate potential blocking caused by one or more missing SDUs. In addition, logical grouping 1002 can include an electrical component for storing the SDU in a reception buffer to facilitate retransmission of the SDU 1010. In this regard, logical grouping 1002 can also include an electrical component for indicating a status in the SDU related to delivery of the PDU to the upper communication layer 1012. Thus, for example, if the PDU is successfully delivered, electrical component 1008 can avoid redelivering the PDU. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
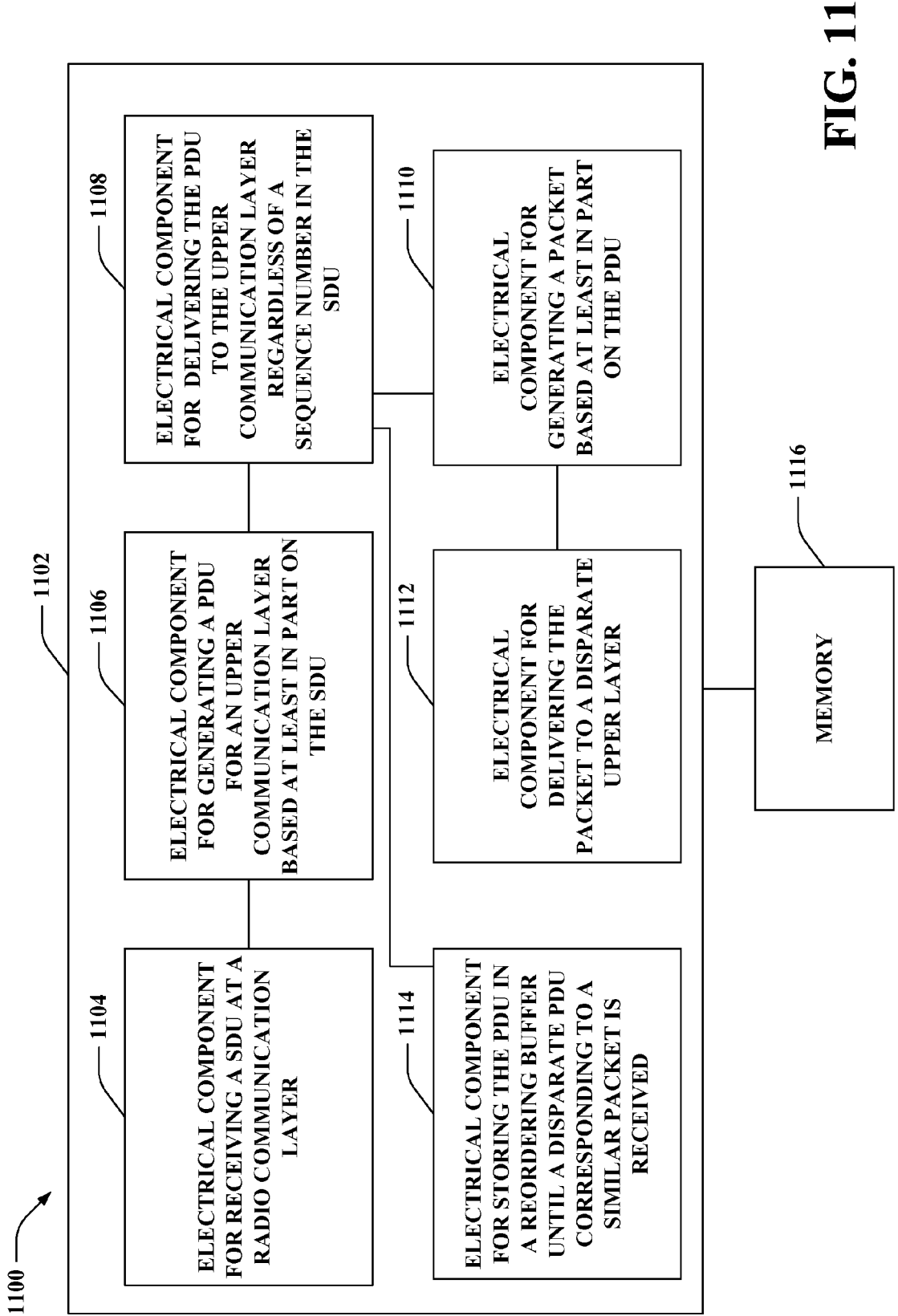
FIG. 11 is an illustration of an example system that communicates out-of-order SDUs to an upper communication layer, which can handle reordering the SDUs.

With reference to FIG. 11, illustrated is a system 1100 that facilitates communicating PDUs to an upper communication layer, and handling ordering of packets at the upper communication layer. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a SDU at a radio communication layer 1104. For example, as described, the radio communication layer can be an RLC or similar layer, and the SDU can be received in a signal from one or more devices. Additionally, logical grouping 1102 can include an electrical component for generating a PDU for an upper communication layer based at least in part on the SDU 1106. As described, this can include associating a header with the SDU, which can include a sequence number and/or additional parameters related to the PDU.

Moreover, logical grouping 1102 can include an electrical component for delivering the PDU to the upper communication layer regardless of sequence number in the SDU 1108. For example, this can include delivering SDUs in PDUs to the upper communication layer as received, such that PDUs can be delivered out-of-order to mitigate potential blocking caused by one or more missing SDUs. In addition, logical grouping 1102 can include an electrical component for generating a packet based at least in part on the PDU 1110. In this example, electrical component 1110 can generate the packets from PDUs with sequential sequence numbers related to the packet. Thus, if a PDU for the packet is not yet received, electrical component 1110 can hold off on generating the packet.

Further, logical grouping 1102 can include an electrical component for delivering the packet to a disparate upper layer 1112. This can be an application layer and/or the like, for example. Also, logical grouping 1102 can comprise an electrical component for storing the PDU in a reordering buffer until a disparate PDU corresponding to a similar packet is received 1114. Thus, as described, packet ordering is handled at the upper communication layer, which can be a PDCP layer. Additionally, system 1100 can include a memory 1116 that retains instructions for executing functions associated with electrical components 1104, 1106, 1108, 1110, 1112, and 1114. While shown as being external to memory 1116, it is to be understood that one or more of electrical components 1104, 1106, 1108, 1110, 1112, and 1114 can exist within memory 1116.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions, procedures, etc. may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   obtaining a service data unit (SDU) from a signal received at a relay, wherein the SDU corresponds to a first device;
   generating a protocol data unit (PDU) related to an upper communication layer based at least in part on the SDU; and
   delivering the PDU to the upper communication layer regardless of a sequence number in the SDU without waiting to receive another SDU that has a smaller sequence number than the SDU.

2. The method of claim 1, further comprising:
   receiving a disparate SDU subsequent to the SDU, wherein the disparate SDU corresponds to a disparate device and includes a disparate sequence number smaller than the sequence number in the SDU; and
   delivering the disparate SDU to the upper communication layer in a disparate PDU subsequent to the delivering the PDU to the upper communication layer.

3. The method of claim 1, further comprising storing the SDU in a reception buffer to allow retransmission of the SDU.

4. The method of claim 3, further comprising initializing an indicator in the SDU that specifies successful delivery of the SDU to the upper communication layer.

5. The method of claim 4, further comprising using the indicator in SDU reordering to determine whether to deliver the SDU to the upper communication layer in the PDU.

6. The method of claim 1, further comprising:
   generating a packet based at least in part on the PDU; and
   delivering the packet to a disparate upper layer.

7. The method of claim 6, further comprising:
   generating a disparate packet based at least in part on a disparate PDU that includes a disparate SDU corresponding to a disparate device, the disparate SDU having a lower sequence number than the SDU; and
   delivering the disparate packet to the disparate upper layer subsequent to the delivering the packet to the disparate upper layer.

8. The method of claim 1, further comprising storing the PDU in a reordering buffer until a related PDU corresponding to a similar packet is received.

9. The method of claim 1, wherein the SDU is extracted at a radio link control layer, and the upper communication layer is a packet data convergence protocol layer.

10. A wireless communications apparatus, comprising:
at least one processor configured to:
  relay data between devices in a wireless network;
  receive a service data unit (SDU) related to a received signal, wherein the SDU corresponds to a first device;
  create a protocol data unit (PDU) for an upper communication layer based at least in part on the SDU; and
  communicate the PDU to the upper communication layer regardless of a sequence number in the SDU without waiting to receive another SDU that has a smaller sequence number than the SDU; and
a memory coupled to the at least one processor.

11. The wireless communications apparatus of claim 10, wherein the at least one processor is further configured to:
  obtain a disparate SDU subsequent to receiving the SDU, wherein the disparate SDU corresponds to a disparate device and comprises a disparate sequence number less than the sequence number in the SDU; and
  communicate the disparate SDU to the upper communication layer in a disparate PDU subsequent to communicating the PDU to the upper communication layer.

12. The wireless communications apparatus of claim 10, wherein the at least one processor is further configured to store the SDU in a reception buffer to facilitate retransmission of the SDU.

13. The wireless communications apparatus of claim 12, wherein the at least one processor is further configured to set an indicator in the SDU that specifies whether the SDU is successfully communicated to the upper communication layer.

14. The wireless communications apparatus of claim 10, wherein the at least one processor is further configured to:
  create a packet based at least in part on the PDU; and
  communicate the packet to a disparate upper layer.

15. The wireless communications apparatus of claim 14, wherein the at least one processor is further configured to:
  create a disparate packet based at least in part on a disparate PDU that includes a disparate SDU corresponding to a disparate device, the disparate SDU having a lower sequence number than the SDU; and
  communicate the disparate packet to the disparate upper layer subsequent to communicating the packet to the disparate upper layer.

16. The wireless communications apparatus of claim 10, wherein the at least one processor is further configured to store the PDU in a reordering buffer until a disparate PDU related to a similar packet is received.

17. An apparatus, comprising:
  means for relaying data between devices in a wireless network;
  means for receiving a service data unit (SDU) at a radio communication layer, wherein the SDU corresponds to a first device;
  means for generating a protocol data unit (PDU) for an upper communication layer based at least in part on the SDU; and
  means for delivering the PDU to the upper communication layer regardless of a sequence number in the SDU without waiting to receive another SDU that has a smaller sequence number than the SDU.

18. The apparatus of claim 17, wherein the means for receiving the SDU subsequently receives a disparate SDU, the SDU corresponds to a disparate device and includes a disparate sequence number smaller than the sequence number in the SDU, and the means for delivering the PDU subsequently delivers a disparate PDU comprising the disparate SDU to the upper communication layer.

19. The apparatus of claim 17, further comprising means for storing the SDU in a reception buffer to facilitate retransmission of the SDU.

20. The apparatus of claim 19, further comprising means for indicating a status in the SDU related to delivery of the PDU to the upper communication layer.

21. The apparatus of claim 17, further comprising:
  means for generating a packet based at least in part on the PDU; and
  means for delivering the packet to a disparate upper layer.

22. The apparatus of claim 21, wherein the means for generating the packet generates a disparate packet based at least in part on a disparate PDU that includes a disparate SDU corresponding to a disparate device, the disparate SDU having a lower sequence number than the SDU, and the means for delivering the packet delivers the disparate packet to the disparate upper layer subsequent to delivering the packet to the disparate upper layer.

23. The apparatus of claim 17, further comprising means for storing the PDU in a reordering buffer until a disparate PDU corresponding to a similar packet is received.

24. A computer program product, comprising:
a non-transitory computer-readable medium comprising:
  code for causing at least one computer to relay data between devices in a wireless network;
  code for causing the at least one computer to receive a service data unit (SDU) related to a received signal, wherein the SDU corresponds to a first device;
  code for causing the at least one computer to create a protocol data unit (PDU) for an upper communication layer based at least in part on the SDU; and
  code for causing the at least one computer to communicate the PDU to the upper communication layer regardless of a sequence number in the SDU without waiting to receive another SDU that has a smaller sequence number than the SDU.

25. The computer program product of claim 24, wherein the computer-readable medium further comprises:
  code for causing the at least one computer to obtain a disparate SDU subsequent to receiving the SDU, wherein the disparate SDU corresponds to a disparate device and comprises a disparate sequence number less than the sequence number in the SDU; and
  code for causing the at least one computer to communicate the disparate SDU to the upper communication layer in a disparate PDU subsequent to communicating the PDU to the upper communication layer.

26. The computer program product of claim 24, wherein the computer-readable medium further comprises code for causing the at least one computer to store the SDU in a reception buffer to facilitate retransmission of the SDU.

27. The computer program product of claim 26, wherein the computer-readable medium further comprises code for causing the at least one computer to set an indicator in the SDU that specifies whether the SDU is successfully communicated to the upper communication layer.

28. The computer program product of claim 24, wherein the computer-readable medium further comprises:
  code for causing the at least one computer to create a packet based at least in part on the PDU; and
  code for causing the at least one computer to communicate the packet to a disparate upper layer.

29. The computer program product of claim 28, wherein the computer-readable medium further comprises:
  code for causing the at least one computer to create a disparate packet based at least in part on a disparate PDU that includes a disparate SDU corresponding to a disparate device, the disparate SDU having a lower sequence number than the SDU; and code for causing the at least one computer to communicate the disparate packet to the disparate upper layer subsequent to communicating the packet to the disparate upper layer.

30. The computer program product of claim 24, wherein the computer-readable medium further comprises code for causing the at least one computer to store the PDU in a reordering buffer until a disparate PDU related to a similar packet is received.

31. An apparatus, comprising:
a receiving component that obtains a service data unit (SDU) at a radio communication layer, wherein the SDU corresponds to a first device;
a protocol data unit (PDU) generating component that creates a PDU for an upper communication layer based at least in part on the SDU; and
a delivering component that communicates the PDU to the upper communication layer regardless of a sequence number in the SDU without waiting to receive another SDU that has a smaller sequence number than the SDU, wherein the apparatus is configured to relay data between a plurality of devices in a wireless network.

32. The apparatus of claim 31, wherein the receiving component subsequently obtains a disparate SDU, the SDU corresponds to a disparate device and includes a disparate sequence number smaller than the sequence number in the SDU, and the delivering component subsequently communicates a disparate PDU comprising the disparate SDU to the upper communication layer.

33. The apparatus of claim 31, further comprising a buffering component that stores the SDU to facilitate retransmission of the SDU.

34. The apparatus of claim 33, further comprising a delivery indicating component that specifies a status in the SDU related to the delivering component communicating the PDU to the upper communication layer.

35. The apparatus of claim 31, further comprising:
a packet generating component that creates a packet based at least in part on the PDU; and
a disparate delivering component at the upper communication layer that communicates the packet to a disparate upper layer.

36. The apparatus of claim 35, wherein the packet generating component creates a disparate packet based at least in part on a disparate PDU that includes a disparate SDU corresponding to a disparate device, the disparate SDU having a lower sequence number than the SDU, and the disparate delivering component communicates the disparate packet to the disparate upper layer subsequent to delivering the packet to the disparate upper layer.

37. The apparatus of claim 31, further comprising a reordering buffer component that stores the PDU until a disparate PDU corresponding to a similar packet is received.

* * * * *